May 16, 1967
H. L. BOHM
3,319,580
GIRDER CRANE MONORAIL BEAM
Filed March 15, 1965
2 Sheets-Sheet 1
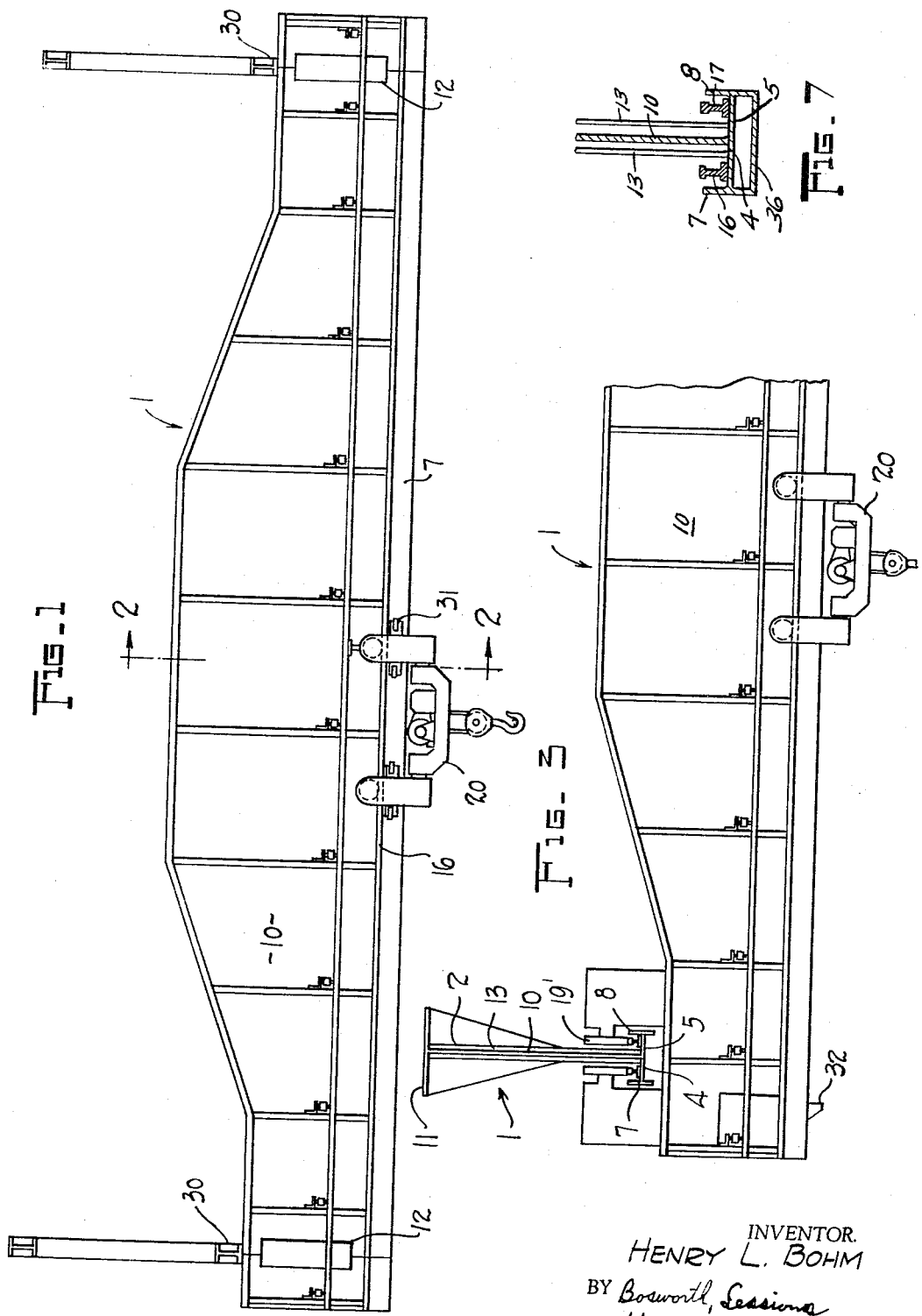
INVENTOR.
HENRY L. BOHM
BY Bosworth, Sessions
Herstrom & Knowles
ATTORNEYS.

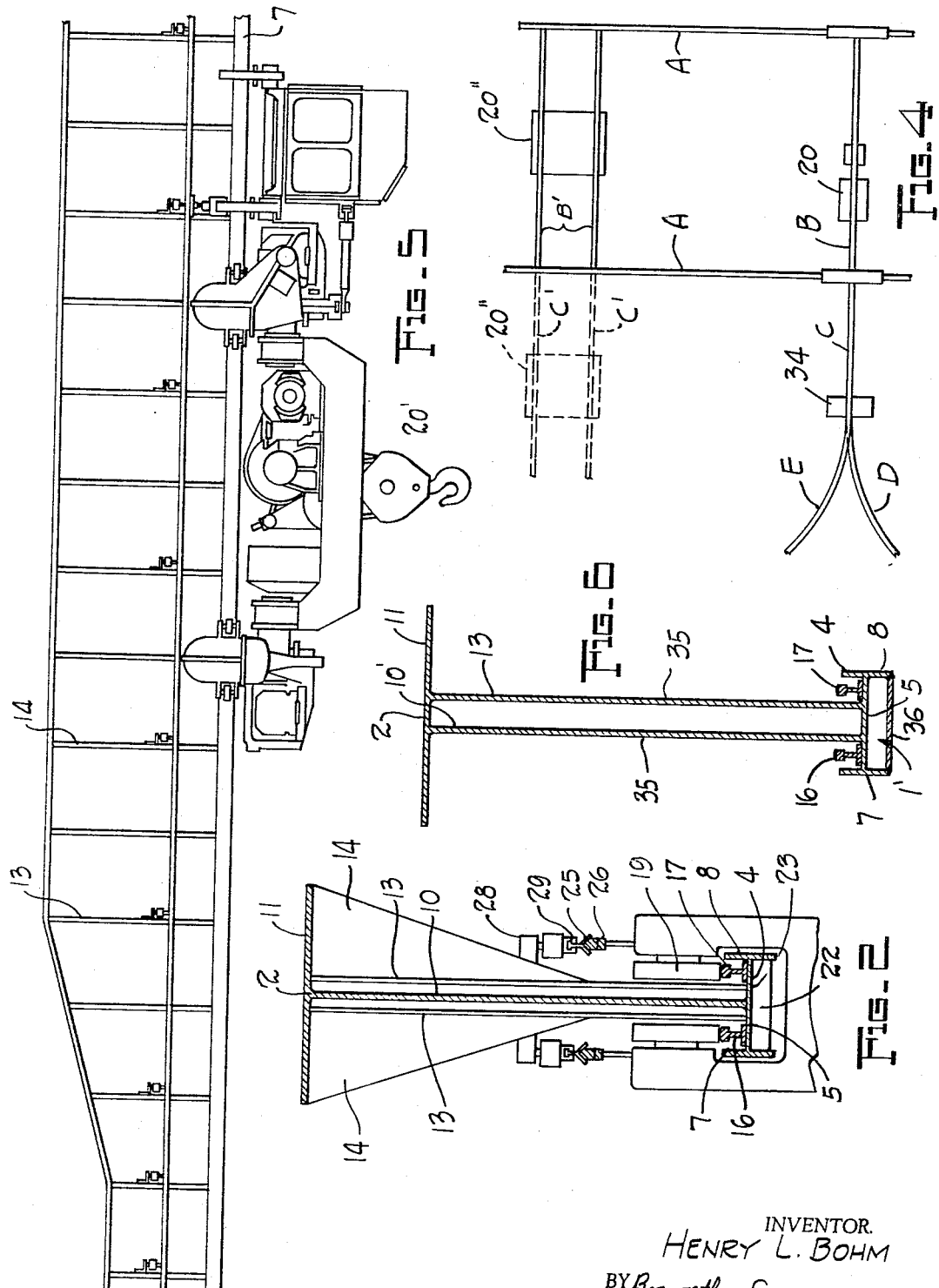

United States Patent Office 3,319,580
Patented May 16, 1967

3,319,580
GIRDER CRANE MONORAIL BEAM
Henry L. Bohm, 16908 Lakewood Heights Blvd.,
Lakewood, Ohio 44107
Filed Mar. 15, 1965, Ser. No. 444,502
16 Claims. (Cl. 104—98)

This application is a continuation-in-part of my copending application, Ser. No. 296,055, filed July 18, 1963, now abandoned.

This invention relates to monorail trolley systems and more particularly to beams for use in monorail trolley systems.

The general object of this invention is to provide a new and improved beam and track support for monorail trolley systems and the like.

Another object of this invention is to provide a new and improved beam and track support for monorail trolley systems and the like, which has markedly greater load capacity and allowable span over monorail beams presently known or used.

Still further objects of this invention include the provision of a new and improved beam and track support for monorail trolley systems and the like which has greater strength, load carrying capacity and allowable span than beams now in use; which utilizes structural plates and shapes commonly available; which may be easily custom adapted for use in a wide range of applications; which is efficient in operation; which is economically manufactured and used; which is of lower cost and more efficient, for a given load capacity and/or span, than monorail beams presently known and used; which may be supported at its ends for movement along transversely extending tracks, or similar beams, to form a girder crane or traveling beam; which may be utilized with switchouts and with means interlocking one, two or more girder cranes to interconnecting spur tracks, whereby the trolleys, cabs or cranes may be switched from girder crane to girder crane and building bay to building bay; which may be used with trolleys, cranes or cabs of standardized or special design, with hoists or other devices, as desired, which are remote, floor or cab controlled; which has separate tracks or rails for the trolley wheels, whereby the tracks or rails may be changed, as required, and wear and cold-rolling of the track or rails does not otherwise adversely affect the beam, its strength or operation; and, which may be utilized in pairs to double the strength and capacity of the beams and/or the girder crane formed thereby.

Another object of this invention is to provide an improved beam and track support for monorail trolley systems and the like which has greater capacity and allowable span, relative to the weight of material used therein, and is readily custom adapted for specific installations and uses.

A still further object of this invention is to provide a new and improved beam and track support for monorail trolley systems and the like obtaining one or more of the objects and advantages hereinbefore set forth.

These and other objects and advantages of this invention will appear from the following description of preferred and modified forms thereof, reference being had to the drawings in which:

FIGURE 1 is a broken elevational view of a monorail beam embodying a preferred form of this invention;

FIGURE 2 is a sectional view taken along the lines —2 of FIGURE 1;

FIGURE 3 is a broken view, partly in elevation and partly in section, showing beam structures embodying this invention in use as a girder crane and as supports therefor;

FIGURE 4 is a schematic plan view of an installation utilizing monorail beams embodying this invention, as shown in FIGURE 3, and having switching and interlock mechanisms, whereby traveling cranes and the like, supported thereon, may be switched from bay to bay and from girder crane beams to fixed beams and back again, and showing the use of monorail beams embodying this invention in pairs to double the load carrying capacity thereof:

FIGURE 5 is a broken elevational view of a monorail beam embodying this invention adapted to support a 25-ton crane on a 100-foot span;

FIGURE 6 is a broken sectional view showing a modified form of vertical web and a modified form of lower beam for a monorail beam embodying this invention; and, FIGURE 7 is a broken section view showing the modified form of lower beam in a monorail beam embodying a preferred form of this invention.

Monorail beams have long been in use for supporting traveling trolleys, cranes and other load carrying apparatus for reciprocal movement on a single beam or track.

Existing monorail beam construction has, however, proved inadequate to meet its full potential in industrial and other applications because of the limitation of span vis-a-vis load which such structures have imposed on the users. Further, existing industrial monorail beams have also proven disadvantageous because of track wear, cost and the inability of existing constructions to readily adapt for use in a wide range of potential applications.

A monorail beam embodying this invention is indicated generally at 1, FIGURE 1. As will hereinafter more fully appear, the beam 1 has a structure providing markedly increased load carrying capacity and allowable span over existing monorail beam constructions. Futher, monorail beams embodying this invention may be used in ordinary installations; as girder cranes including installations in which both the fixed and traveling beams embody this invention and in installation comprising switchouts, means for interlocking one or more girder cranes with spur tracks, gravity systems, elevators and/or drop sections. Monorail beams embodying this invention can be used with trolleys of standardized or special design including, inter alia, furnace chargers, forging manipulators, stackers, hoists, bucket and magnet trolleys and cranes, which may be remote, floor or cab controlled, as desired.

Further, as will hereinafter more fully appear, monorail beams embodying this invention may be utilised in multiple units to increase their capacity and when so used as twin-beam girder cranes permit transfer of the trolley supported thereon to interlocked, parallel beams, if desired.

Finally, monorail beams embodying this invention are fabricated of plates and shapes which are commercially available, whereby monorail beams embodying the advantages of this invention also have greater efficiency and economy of manufacturer and use.

More particularly, as best seen in FIGURES 1 and 2, a monorail beam 1 embodying this invention comprises a plurality of commercially available shapes and plates forming a double I-beam structure having one vertical, longitudinally extending I-beam 2 (or T section) and a second horizontal, longitudinally extending I-beam 4 forming the lower flange of the vertical I-beam 2. Horizontal I-beam 4 is conveniently a commercially available rolled shape, such as a wide flange I-beam, as shown, albeit fabricated shapes may be used, if desired, having a web portion 5 and two longitudinally extending, vertical flanges 7 and 8, respectively.

Horizontal I-beam 4 comprises the lowermost flange of vertical I-beam 2, which, also, comprises a vertical web portion 10 and an upper horizontal flange 11. I-beam 2 is conveniently formed by welding commercially available plates of desired size together in a T-formation to form the flange 11 and web 10 and welding the web 5 of the I-beam 4, intermediate the flanges 7 and 8, to the end of plate or web 10 remote from flange 11.

Adjacent beam sections are spliced together by plates 12 which are welded or otherwise joined to the adjacent webs 10. This beam structure, with a flange of one I-beam comprising a second horizontal I-beam with vertical flanges at its ends, provides unexpectedly increased strength in the I-beam 2 and, a fortiore, to the monorail beam 1, while permitting the use of commercially available shapes to fabricate the monorail beam. Further, the span and load carrying capacity of the completed monorail beam is readily adapted to any desired capacity or installation requirement by changing the dimensions of the plates and shapes used.

In addition, the web 10 of I-beam 2 can be further strengthened by welding vertically extending stiffeners 13 thereto. Stiffeners 13 are conveniently formed from commercially available angles or other shapes and are secured to the web 10, as by welding, and are further conveniently reinforced and held in position by stiffening means, such as gussets 14, which are fastened to and interconnect the flange 11 with the stiffeners 13, respectively, and web 10.

Monorail beam 1 provides an overhead track upon which the wheels of a trolley, crane, or other device can operate and run.

Such tracks are subject to wear and deterioration, due to cold rolling caused by the wheels of the load carrying trolleys, cranes, etc., reciprocally and repeatedly running thereover. The problem of track deterioration is compounded when the track itself is a part of the structure of the monorail beam and is designed to contribute strength and capacity thereto. Accordingly, this invention includes structure whereby the wheel tracks or rails are easily changed, interchanged or replaced, as desired, when worn and deteriorated without otherwise affecting the use, purpose and function of the monorail beam 1.

To this end, monorail beam 1 is provided with structurally separate rails or tracks 16, which extend longitudinally on both sides of web 10 and are preferably supported or carried by the web 5 of I-beam 4, and web 5 is, therefore, of sufficient width, intermediate the web 10 and the flanges 7 and 8, respectively, to receive a track or rail 16 on each side of web 10.

Rails 16 may be rolled rails, as shown, or bar type rails, and are held in place, as by wedging, bolting or other means, so as to permit their selective removal and exchange, as necessary, without otherwise affecting the monorail beam 1.

In order to properly support the rails 16 and prevent deleterious effect on the I-beam 4 and monorail beam 1, as the wheels 19 and loads, such as trolley or crane 20 supported thereon, roll therealong, transversely extending ribs 22 are preferably secured, as by welding, to the lower side 23 of web 5, and the flanges 7 and 8, respectively.

Monorail beam 1 also supports conductor bars 25 by which electrical energy is conducted through the collectors 26 to the trolley or crane 20. Bars 25 are supported in a conventional manner by means of hangers 28 and insulators 29.

Monorail beam 1 is conveniently and preferably given a girder or bridge shape with a greater height in the central portion than at the ends, as shown in FIGURE 1, in order to provide the maximum capacity at improved efficiency.

Monorail beam 1 is supported or suspended on the building structure in any suitable manner, as, for example, by welding or bolting to transversely extending frames 30 of the building, as shown in FIGURE 1, at the desired height above the floor as required by the particular building and installation being made.

Crane 20 may also be stabilized on beam 1 by lateral wheels 31, see FIGURE 1, riding on the exterior of flanges 7 and 8, respectively. Also, suitable hydraulic or other stop means indicated schematically at 32, FIGURE 3, are preferably provided at the rail ends.

Monorail beams 1 embodying this invention have great versatility in addition to their increased load and span capacity and improved convenience of manufacture and installation.

Thus, for example, monorail beams embodying this invention may be constructed as girder cranes. In such an instance one beam is mounted to travel on two, similar parallel, fixed beams extending in a direction transverse to the length of the first beam. Such an installation is depicted in FIGURE 3, wherein like reference characters refer to like parts as in FIGURES 1 and 2. In this instance, however, the beam 1, which is to comprise the girder crane, is provided with suitable wheels 19' at both ends, and these wheels 19' ride on the rails 16, respectively, of two similar parallel beams 1, which are fixedly mounted on the building structure, to extend transversely of the traveling beam at the ends thereof. Thus, in effect, the traveling beam in FIGURE 3 replaces the cranes 20 of two parallel beams as shown in FIGURE 1. In practice, the traveling beam of FIGURE 3 may be moved fore and aft along the fixed beams while the crane 20, in FIGURE 3, is adapted to move back and forth on the traveling beam, thereby providing a girder crane. The traveling beam of FIGURE 3 also includes means, not shown, for driving and controlling the movement of the traveling beam.

FIGURE 5 discloses a beam 1 embodying this invention and providing a track for a twenty-five ton crane or trolley on a one hundred foot span.

FIGURE 4 is a schematic disclosure of a monorail system utilizing monorail beams embodying this invention to provide both a girder crane, transfer of trolleys or cranes between lines or bays or to spur tracks and switching of trolleys and cranes between spur tracks.

In this instance the beams A are fixed beams, as shown in FIGURE 3, providing tracks for the traveling beam B, which functions as a girder crane, as shown in FIGURE 3 and described above, and has a trolley or crane 20 supported thereon. The system also includes other fixed beams, or spur tracks, C, D, and E, which are also similar to beam 1 and are disposed so that beam C extends transverse of the beams A and at height and location such that beam B may be aligned therewith, and locked in position relative thereto, if desirer. When beams B and C are so aligned crane 20 can be moved from one to the other, thereby transferring the crane from one bay or line to another, or from the girder crane to a spur track. Beams D and E are shown in switching relationships with beam C so that by throwing a switch, indicated schematically at 34, the trolley on beam, or spur track, C, can be diverted in either direction, to D or E, or a trolley may be received from either beam D or E onto beam C. Obviously, any desired number of beams or spur tracks C and branches may be provided and a plurality of trolleys or cranes of the same or different style may be used in a single system if desired. And, of course, spur tracks and switchouts can be used together in systems not having girder cranes.

FIGURE 4 also depicts schematically the use of two beams embodying this invention, such as shown in FIGURE 5, as a unit, in the manner shown in FIGURE 3, to form a double girder crane B' to support a single 50-ton crane 20" and the use of parallel spur tracks C' to receive the single crane 20" of the double girder crane B'.

A modified form of beam embodying this invention is indicated at 1' in FIGURE 6, wherein like reference characters refer to like parts as in FIGURES 1 and 2.

Beam 1' is in all respects similar to beam 1 except that the web 10' comprises a plurality of parallel plates 35 to form a box-like web, which may or may not be braced internally with commercially available members or shapes and the horizontal I-beam 4 is provided with a stiffening plate 36 welded between the lower edges of flanges and 8. Stiffener plate 36 may also be used in the preferred form of this invention illustrated in FIGURE 1, if desired.

FIGURE 7 shows the beam 1 of FIGURE 2 with a stiffener plate 36, as in FIGURE 6, between the flanges 7 and 8 of beam 4.

For an installation such as shown in FIGURE 5, to support a twenty-five ton crane on a 100-foot span, web 10 and flange 11 would be of 1" plates 6'3½" deep and 3½' wide, I-beam 4 would be a 30-pound wide flange I-beam 14" x 6¾" flange with a ¼" (.270) web and a ⅜" flange, and the beam would include a stiffener 3'5" of 1" plate 13¼" wide to fit between the flanges 7 and 8 of the I-beam 4, as shown in FIGURE 7. Without the plate 36 this beam would support a 25-ton load on a span of 65 to 70 feet.

Modifications, changes and improvements to the preferred and modified forms of the invention herein particularly disclosed and described may occur to those skilled in the art who come to understand the principles and precepts thereof. Accordingly, the scope of the patent issued hereon should not be limited to the specific forms of the invention herein particularly illustrated, disclosed and described but only consistent with the advance by which the invention has promoted the art.

I claim:

1. A monorail beam for comprising a longitudinally extending transverse top plate, a longitudinally extending vertical plate extending downwardly from said top plate and comprising a first web with a lower edge, a longitudinally extending I-beam having a web and flanges and secured to said lower edge of said first web with said I-beam web horizontal and said flanges vertical and one said flange on each side of and spaced from said first web, vertically extending stiffeners secured to and spaced longitudinally along both sides of said first web, gusset plates secured to said stiffeners, respectively, and said top plate, vertical stiffeners secured to said I-beam flanges and the underside of said I-beam web, longitudinally extending rails mounted on the upper surface of said I-beam web with one said rail on each side of said first web and intermediate said first web and the adjacent I-beam flange, respectively, electrically insulated support means carried by said beam, a longitudinally extending electrical conducting bar supported by said support means, and a trolley mounted on said beam, said trolley having electrical collector means engaging said conducting bar and wheels rolling on said rails, respectively.

2. A monorail beam for comprising a longitudinally extending transverse top plate, a longitudinally extending vertical plate extending downwardly from said top plate and comprising a first web with a lower edge, a longitudinally extending I-beam having a web and flanges and secured to said lower edge of said first web with said I-beam web horizontal and said flanges vertical and one said flange on each side of and spaced from said first web, vertically extending stiffeners secured to and spaced longitudinally along both sides of said first web, gusset plates secured to said stiffeners, respectively, and said top plate, vertical stiffeners secured to said I-beam flanges and the underside of said I-beam web, and longitudinally extending rails mounted on the upper surface of said I-beam web with one said rail on each side of said first web and intermediate said first web and the adjacent I-beam flange, respectively.

3. A monorail beam for comprising a longitudinally extending transverse top plate, a longitudinally extending vertical plate extending downwardly from said top plate and comprising a first web with a lower edge, a longitudinally extending I-beam having a web and flanges secured to said lower edge of said first web with said I-beam web horizontal and said flanges vertical and one said flange on each side of and spaced from said first web, stiffening means secured to said first web and top plate, vertical stiffeners secured to said I-beam flanges and the underside of said I-beam web, and longitudinally extending rails mounted on the upper surface of said I-beam web with one said rail on each side of said first web and intermediate said first web and the adjacent I-beam flange, respectively.

4. The beam according to claim 3 in which said rails are detachably mounted on said I-beam web.

5. A monorail beam comprising a longitudinally extending transverse top plate, a longitudinally extending vertical plate extending downwardly from said top plate and comprising a first web with a lower edge, a longitudinally extending I-beam having a web and flanges, said I-beam web being secured to said lower edge of said first web with said I-beam web horizontal and said flanges vertical and one said flange on each side of and spaced from said first web, and longitudinally extending rails mounted on the upper surface of said I-beam web with a rail on each side of said first web.

6. The beam according to claim 5 in which said flanges have lower edges and a horizontal, longitudinally extending stiffener plate is secured between said lower edges.

7. A monorail beam comprising a longitudinally extending transverse top plate, longitudinally extending vertical plate means extending downwardly from said top plate and having a lower edge, longitudinally extending beam means having a web and flanges, said web being secured to said lower edge of said vertical plate means with said beam means web horizontal and said flanges vertical, stiffener means secured to said vertical plate means, stiffeners secured to said flanges and the underside of said web, longitudinally extending rails mounted on the upper surface of said web with a rail on each side of said vertical plate means.

8. A girder crane comprising a longitudinally extending transverse top plate, a longitudinally extending vertical plate extending downwardly from said top plate and comprising a first web with a lower edge, a longitudinally extending I-beam having a web and flanges, said I-beam web being secured to said lower edge of said first web with said I-beam web horizontal and said flanges vertical and one said flange on each side of and spaced from said first web, vertically extending stiffeners secured to and spaced longitudinally along both sides of said first web, gusset plates secured to said stiffeners, respectively, and said top plate, stiffener means secured to said I-beam flanges, longitudinally extending rails mounted on the upper surface of said I-beam web with one said rail on each side of said first web and intermediate said first web and the adjacent I-beam flange, respectively, a trolley supported on said girder crane with wheels riding on said rails, respectively, and wheels mounted on both ends of said girder crane for movement along fixed tracks.

9. The girder crane according to claim 8 in which said flanges have lower edges and said stiffener means includes a horizontal plate extending therebetween.

10. A girder crane comprising a longitudinally extending transverse top plate, a longitudinally extending vertical plate extending downwardly from said top plate and comprising a first web with a lower edge, a longitudinally extending I-beam having a web and flanges, said I-beam web being secured to said lower edge of said first web with said I-beam web horizontal and said flanges vertical and one said flange on each side of and spaced from said first web, first stiffener means on said first web, second stiffener means secured to said I-beam flanges, longitudinally extending rails mounted on the upper surface of said I-beam web with one said rail on each side of said first web and intermediate said first web and the adjacent I-beam flange, respectively, a trolley supported on said girder crane with wheels riding on said rails, respectively, and wheels mounted on both ends of said girder crane for movement along fixed tracks.

11. A girder crane system comprising two fixed parallel beams and a movable beam, each said beam comprising a longitudinally extending transverse top plate, a longitudinally extending vertical plate extending downwardly from said top plate and comprising a first web with a lower edge, a longitudinally extending I-beam having a web and flanges, said I-beam web being secured to said lower edge of said first web with said I-beam web horizontal and said flanges vertical, vertically extending stiffeners secured to and spaced longitudinally along both sides of said first web, gusset plates secured to said vertical stiffeners, respectively, and said top plate, stiffener means secured to said I-beam flanges, longitudinally extending rails mounted on the upper surface of said I-beam web, with one said rail on each side of said first web and intermediate said first web and the adjacent I-beam flange, respectively, said movable beam extending transversely of said fixed beams and having wheels at both ends riding on the respective rails of said fixed beams, respectively.

12. The girder crane system according to claim 11 wherein said stiffener means are also secured to the undersides of said I-beam web.

13. The girder crane system according to claim 11 wherein said flanges in at least one I-beam have lower edges and said stiffener means includes a longitudinally extending horizontal plate extending therebetween.

14. A girder crane system comprising two fixed parallel beams and a movable beam, each said beam comprising a longitudinally extending transverse top plate, a longitudinally extending vertical plate extending downwardly from said top plate and comprising a first web with a lower edge, a longitudinally extending I-beam having a web and flanges, said I-beam web being secured to said lower edge of said first web with said I-beam web horizontal and said flanges vertical, stiffener means secured to said first web, stiffener means secured to said I-beam flanges, and longitudinally extending rails mounted on the upper surface of said I-beam web with one said rail on each side of said first web and intermediate said first web and the adjacent I-beam flange, respectively, said movable beam extending transversely of said fixed beams and having wheels at both ends riding on the respective rails of said fixed beams, respectively.

15. A girder crane system comprising two fixed parallel beams and a movable beam, each said beam comprising a longitudinally extending transverse top plate, a longitudinally extending vertical plate extending downwardly from said top plate and comprising a first web with a lower edge, a longitudinally extending I-beam having a web and flanges, said I-beam web being secured to said lower edge of said first web with said I-beam web horizontal and said flanges vertical, and longitudinally extending rails mounted on the upper surface of said I-beam web, with one said rail on each side of said first web and intermediate said first web and the adjacent I-beam flange, respectively, said movable beam extending transversely of said fixed beams and having wheels at both ends riding on the respective rails of said fixed beams, respectively.

16. A girder crane comprising a longitudinally extending transverse top plate, a longitudinally extending vertical plate extending downwardly from said top plate and comprising a first web with a lower edge, a longitudinally extending I-beam having a web and flanges, said I-beam web being secured to said lower edge of said first web with said I-beam web horizontal and said flanges vertical and one said flange on each side of and spaced from said first web, longitudinally extending rails mounted on the upper surface of said I-beam web with one said rail on each side of said first web and intermediate said first web and the adjacent I-beam flange, respectively, a trolley supported on said girder crane with wheels riding on said rails, respectively, and wheels mounted on both ends of said girder crane for movement along fixed tracks.

References Cited by the Examiner

UNITED STATES PATENTS

| | | | |
|---|---|---|---|
| 758,399 | 4/1904 | Wilke | 103—98 |
| 931,208 | 8/1909 | Krieger | 104—103 |
| 1,142,124 | 6/1915 | Smith | 104—95 |
| 1,373,637 | 4/1921 | Riblet | 104—101 |
| 1,591,858 | 7/1926 | McClintic | 189—37 |
| 1,643,642 | 9/1927 | Phillips | 104—98 |
| 1,722,291 | 7/1929 | Hanak | 104—107 |
| 1,736,292 | 11/1929 | Sleeman | 105—416 |
| 1,831,343 | 11/1931 | Caldwell | 219—124 |
| 2,958,743 | 11/1960 | Moore | 104—93 X |
| 3,043,408 | 7/1962 | Attwood | 180—34 |

ARTHUR L. LA POINT, *Primary Examiner.*

MILTON BUCHLER, *Examiner.*

H. BELTRAN, *Assistant Examiner.*